United States Patent Office 2,903,248
Patented Sept. 8, 1959

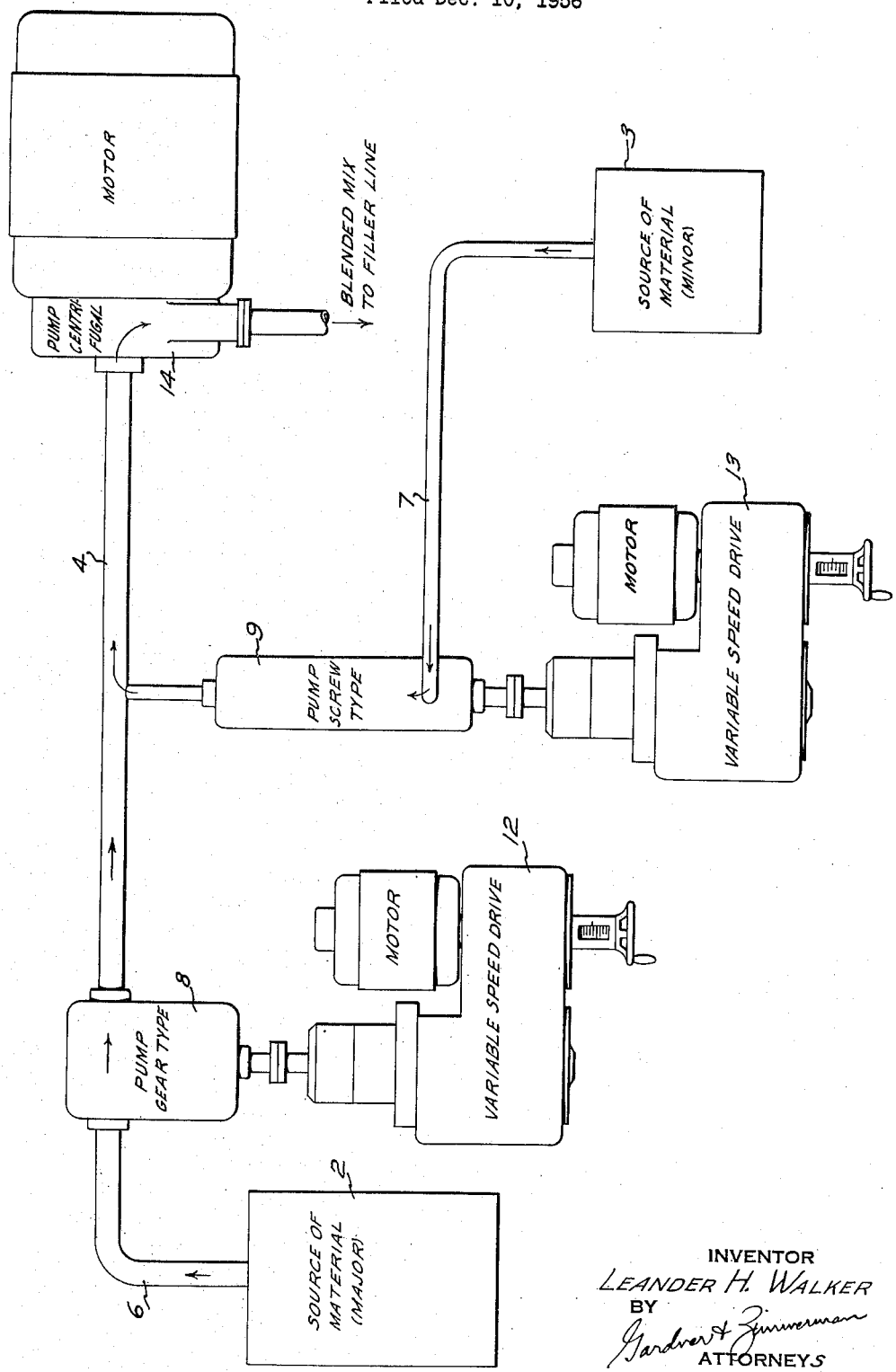

2,903,248
SYSTEM OF MIXING LIQUIFORM INGREDIENTS

Leander H. Walker, Berkeley, Calif.

Application December 10, 1956, Serial No. 627,249

1 Claim. (Cl. 259—10)

The invention relates to a system of mixing or blending liquiform substances, and is particularly applicable for use where one or more of the substances are of relatively thick consistency or highly viscous, and where the product is to be delivered to a container filler line or other equipment for immediate further processing.

An object of the invention is to provide a system of the character described, in which feeding of the different liquiform ingredients in the desired proportions, combining the ingredients so as to provide a substantially homogeneous mixture thereof, and discharge of the liquiform mixture from the system, will take place as a continuous unified operation.

Another object of the invention is to provide a system of the character described in which all of the operations occur as a part of and in the course of continuous movement of the ingredients from introduction of the different ingredients to the system to the delivery of the final product.

A further object of the invention is to provide a system of the character described which will serve to effectively combine ingredients from separate sources of supply without entailing the use of mixing tanks, and particularly when the ingredients differ markedly in specific gravity, consistency, or viscosity.

A still further object of the invention is to provide a system of mixing liquiform ingredients which will greatly reduce the time required for producing a thorough mixture, thereby not only affording greater efficiency, but also is of particular importance when the system is being utilized for processing and delivering a hot mixture of the ingredients to the filling line, since far less residence time of the ingredients is required.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

The single figure of the drawing is a schematic representation showing the operative relationship of members utilized in a preferred embodiment of the invention.

Briefly stated, the invention involves a means and process of mixing liquiform ingredients by which all of the operations are carried on uninterruptedly and simultaneously, and the ingredients throughout these operations moved continuously and rapidly to a filling line or other equipment as the case may be. More particularly in the arrangement depicted in the drawing, the system provides for converting two or more separate ingredients into a uniform mixture or blend by feeding the different ingredients separately into a common line in the desired proportions such as by means of pumps controlled as to volume output by variable speed drives, and conducting the associated ingredients to a centrifugal pump in said line where the different ingredients are intimately mixed by the centrifugal action within the pump. The agitating action of the centrifugal pump is confined to the relatively small amount of material actually passing through the pump at any given moment. Also the centrifugal pump operates at a capacity considerably over what is required for the amount of liquid delivered by the feed pumps, and the resultant effect is to quickly produce a substantially homogeneous mixture of the ingredients. Delivery of the mixture to the filling line, etc., is arranged to take place continuously and while the mixture remains in the homogeneous state.

In accordance with conventional practices, and particularly in cases where it is desired to make blends containing food purees, mixing or blending is carried out by placing the desired quantities of the different ingredients in a tank where they are agitated to attain the desired degree of homogeneity. The rate of discharge is usually limited by the feed requirements of the filling line or other equipment to which the delivery is made. Such a method as will be evident entails agitating large bodies of relatively heavy liquids before any portions may be withdrawn and delivered, requires considerable residence time of the ingredients in the tank, and permits only intermittent delivery of the product. In contrast with the foregoing, with my system, the use of mixing tanks and heavy duty equipment is dispensed with, and processing is speeded up in general from the order of one-half hour or more to a matter of a few seconds.

A detail description follows:

The apparatus, indicated in the drawing, is of a form to utilize the process so as to provide a mixture of liquiform ingredients from two separate sources of supply. It will be understood, however, that the same principles are applicable where a mixture or blend of ingredients from more than two sources of supply is desired.

Usually the ingredients to be mixed are classified as major and minor ingredients, the one designed to provide the principal portion of the mix being designated the major, where the ingredient which is usually utilized for blending is termed the minor. In the drawing reservoirs 2 and 3 are indicated for containing the supply of the major and minor ingredients respectively, and as will be noted the reservoir 2 is illustrated as the larger. The different reservoirs are connected to a common line or conduit 4 by means of feed pipes 6 and 7, and the material from the reservoirs is pumped through the pipes 6 and 7 and into the conduit 4 by means of pumps 8 and 9 respectively. Pumps 8 and 9 are designed to provide a uniform flow and are controlled as to volume output, such as by variable speed drive means 12 and 13. With this arrangement the different ingredients will be delivered to the conduit continuously in the desired proportions.

The conduit 4 provides for the transmission of the combined ingredients to a filler line or other equipment (not shown), and in accordance with the present invention, the ingredients are subjected to a thorough mechanical mixing action while being transported through the conduit and allowed to continue without interruption in its movement. For the purpose of mechanically agitating the ingredients as they pass through the conduit, a means such as a centrifugal pump 14 is operatively interposed in the conduit so that all of the material passing through the conduit will be required to pass through the pump.

It is to be noted that the pumps 8 and 9 are designed to provide the motive power for moving the material through the feed pipes and conduit at a uniform rate, and as an important feature of the invention, the centrifugal pump is sufficiently over-capacity in size or operated at over-capacity in relation to the amount of material moving through the conduit under the action of pumps 8 and 9, that it subjects the material in passing through it to such a violent agitation as to effect a complete mixing of the ingredients by the time the latter is discharged from the pump. In practice it has been found that in using a centrifugal pump of conventional design, in general at least a hundred percent over-capacity operation of the pump produces the desired mixing of the ingredients in the pump, or in other words, the centrifugal pump should be operated at a capacity substantially at least twice as great as that required to pump the amount of material delivered by the feed pumps.

It is important to note that with my process only a relatively small amount of material is being agitated at any given time, and that volume is attained by continuously agitating the same amount of material at a rate corresponding with the movement of the material through the conduit. By thus avoiding the need of agitating large bodies of material, the need of employing heavy duty equipment is also avoided and as will therefore be evident, the process of my invention may be performed with a simple assembly of light duty equipment and largely standard parts.

With the arrangement as shown and described, the mixed ingredients will be discharged from the centrifugal pump at substantially the same rate that the combined but unmixed ingredients are delivered to the pump, and thus a continuous stream may be dispensed from the system equal in volume to the combined volumes of the streams of the separate ingredients being continuously supplied by the feed pumps. The mixing and delivery of the product as provided for with my system is particularly advantageous when the system is utilized to deliver the product directly to a filler line. This is so because the product may be supplied to the filler line freshly after the mixing is complete and without interruption in the continuity of the supply. Furthermore the operation of the system may be geared up and tied in with the operation of the filler. For instance, by regulating the output and capacity of the pumps, the amount of material delivered to the filler can be adjusted to the requirements of the latter. It is to be understood, however, that the system is not limited to use with a filler line, but may be used to advantage with other processes, processing machinery and equipment, and particularly where a quickly and thoroughly mixed liquiform product is desired.

The system of the present invention has been found to be especially effective for the quick mixing of thick and viscous ingredients such as used for example in the production of what is known as "Appleberry." This product is a blend of applesauce, raspberry puree and artificial coloring matter. The raspberry and coloring are in this case the minor ingredient. The applesauce is the major ingredient and must be kept at near boiling so as to insure proper can filling temperatures. Complete mixing of the ingredients was obtained at a line velocity of approximately two feet per second, or a residence time of approximately one second in the centrifugal pump. Besides the fact that very little heat was thus lost in the process of mixing, the heat experience to which the ingredients were subjected during the process was relatively negligible. In comparison with the foregoing, to obtain the same results with the use of conventional systems, where periodic refilling is entailed, mixing of large batches of material to the desired degree before discharge may be permitted, and limitations imposed on the speed of discharge of material from the tank by the filling line, etc. capacities, as much as forty minutes are required.

What is claimed is:

In a system for mixing different liquiform food ingredients and delivering the mixed product to containers in a filling line, at least one of said ingredients being relatively thick and having a viscosity substantially at least equal to that of applesauce at the latter's boiling temperature and not readily mixable with the other ingredient, separate feed conduits for the different ingredients, a common conduit to which said feed conduits lead, means for pumping the ingredients from the feed conduits to the common conduit and to move same through the latter, said means comprising a uniform flow pump provided for each feed conduit and having a control for governing the volume of material delivered by the pump, and a centrifugal pump having a central axial inlet and a peripheral outlet positioned in the common conduit between the discharge end thereof and the points at which the feed material enters the said conduit, said centrifugal pump being operatively connected in the common conduit to cause all of the ingredients to be introduced into the pump at said central inlet and be discharged therefrom at said peripheral outlet, and being of a size and arranged for continuous operation at a capacity substantially at least twice as great as that required to pump the amount of material delivered by the feed pumps.

References Cited in the file of this patent

UNITED STATES PATENTS

| | | |
|---|---|---|
| 2,009,622 | Kennedy | July 30, 1935 |
| 2,260,834 | Everett | Oct. 28, 1941 |
| 2,556,239 | Tuve et al. | June 12, 1951 |

FOREIGN PATENTS

| | | |
|---|---|---|
| 689,818 | Great Britain | of 1953 |